United States Patent [19]

Turiot et al.

[11] 4,422,603
[45] Dec. 27, 1983

[54] LANDING GEAR FOR AIRCRAFT

[75] Inventors: André Turiot, Morsang S/Orge; Michel Derrien, Versailles, both of France

[73] Assignee: Messier-Hispano-Bugatti (S.A.), Montrouge, France

[21] Appl. No.: 354,009

[22] Filed: Mar. 2, 1982

[30] Foreign Application Priority Data

Mar. 5, 1981 [FR] France ................. 81 04421

[51] Int. Cl.³ ............................................. B64C 25/14
[52] U.S. Cl. ................................................. 244/102 R
[58] Field of Search ......... 244/100 R, 102 R, 102 SL, 244/104 FP, 50, 102 SS

[56] References Cited

U.S. PATENT DOCUMENTS

| 2,471,603 | 5/1949 | Bishop | 244/102 SL |
| 2,497,489 | 2/1950 | Coursen et al. | 244/102 SL |
| 2,659,555 | 11/1953 | Schlender | 244/100 R |
| 3,899,147 | 8/1975 | Masclet et al. | 244/102 R |
| 3,904,153 | 9/1975 | Watts | 244/50 |

FOREIGN PATENT DOCUMENTS 1465428 12/1966 France .
1042190 9/1966 United Kingdom ............ 244/102 R Primary Examiner—Galen L. Barefoot
Attorney, Agent, or Firm—Sughrue, Mion, Zinn, Macpeak and Seas

[57] ABSTRACT

The present invention relates to landing gears retractable between two positions.

The landing gear includes essentially a lever (14) mounted rotatably around an axis (5), a rocker beam (7) mounted rotatably on the same axis (5), a strut (21) including two links (22,23) pivoting in relation to each other, the strut being connected to the lever, a shock absorber (18) fixed respectively on the lever (14) and the rocker beam (7), and an actuating cylinder (32) for applying a pivoting force to the lever (14). This landing gear finds a particularly advantageous application in aircraft of the commuter type.

13 Claims, 4 Drawing Figures

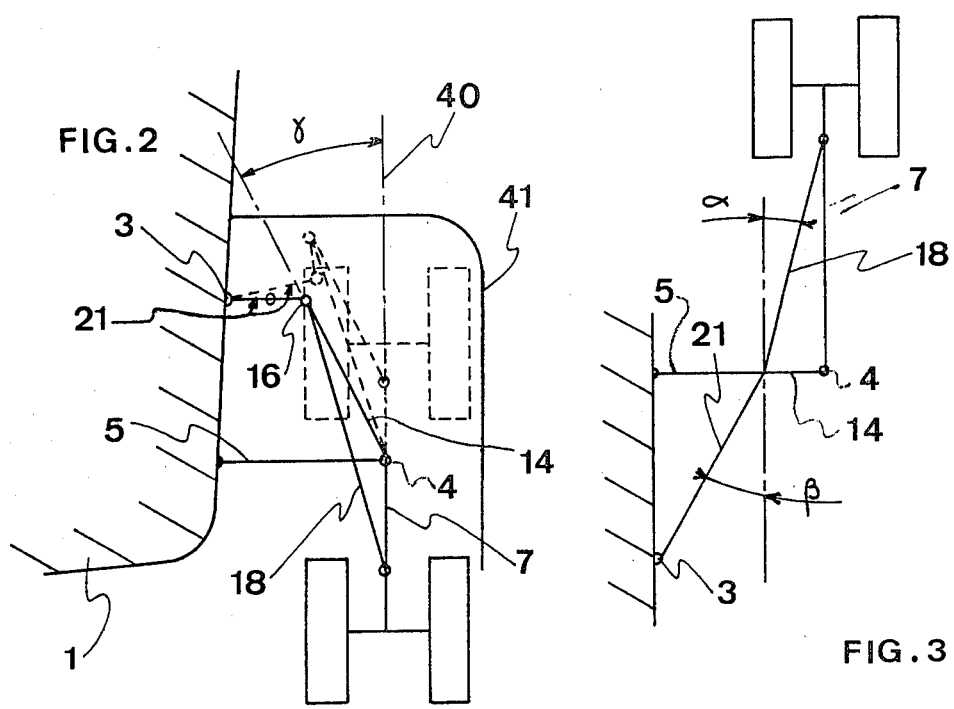
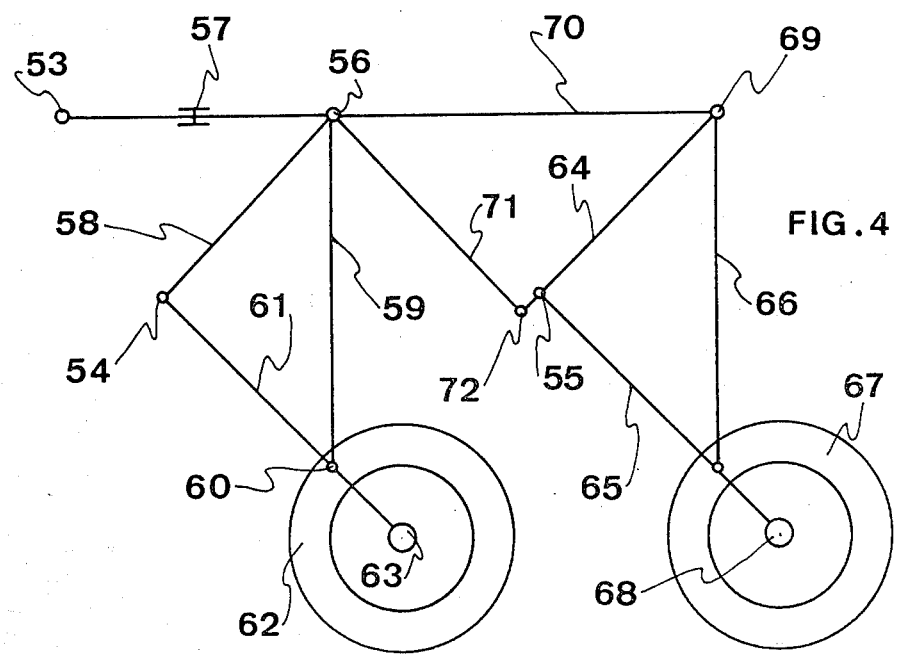

LANDING GEAR FOR AIRCRAFT

CROSS REFERENCE TO RELATED APPLICATION

The present application relates to application Ser. No. 354,010 filed on Mar. 2, 1982, and entitled "FUSELAGE LANDING GEAR WITH TANDEM WHEELS" by inventors Andre Turiot and Michel Derrien, our reference 4126.

FIELD OF THE INVENTION

This invention relates to landing gears and more particularly to retractable landing gears for aircraft, or, more commonly, for airplanes, helicopters, etc.

BACKGROUND OF THE INVENTION

There is presently a new generation of aircraft designed to operate over relatively short distances and which those of the art refer to as "commuters".

In fact, this type of aircraft is characterized essentially by a relatively simplified design, entailing the need to have landing gears meeting new criteria.

Thus, most of these commuters are equipped with landing gears which do not retract into bays designed for this purpose in the body of the aircraft but which, when they are in a retracted position, are stowed in covers on the side of the aircraft fuselages.

This led to a new generation of landing gears which generally fall into two categories: a first category of the twin-wheel type in which the two wheels are coupled to each other; and a second category known as a tandem arrangement in which two wheels are coupled one behind the other substantially in the same plane, with means for coupling them so as to obtain, for example, the extension or retraction of the landing gear with a single actuation system.

Landing gears developed up to the present time have been designed either to constitute a twin-wheel undercarriage or a tandem undercarriage. However, none of these has been designed specially to provide independently and with a minimum of modification both a twin-wheel type landing gear and a tandem-wheel type landing gear.

It is accordingly the object of the present invention to provide a retractable type landing gear; notably for aircraft, which can constitute a basic element common to both twin-wheel landing gears and tandem-wheel landing gears.

SUMMARY OF THE INVENTION

More precisely, it is the object of the present invention to provide a retractable landing gear actuated between two positions, respectively the retracted and extended positions, for a rigid-frame craft, said landing gear comprising a lever mounted rotatably on a first pin incorporated in the frame, a rocker beam mounted rotatably on a second pin incorporated in said frame, a strut capable of "breaking" and mounted rotatably at a first of its ends on a first point incorporated in said frame, connecting means for linking the other end of said strut to said lever, controllable means for breaking the alignment of said strut components, a shock absorber connecting the second point of said lever to a third point of said rocker beam, and means for applying a controllable swivelling force to said lever.

According to another feature of the present invention, the connecting means consist of a knuckle joint with two substantially perpendicular degrees of rotation.

According to another feature, said strut consists of two links pivoting on each other around a third axis substantailly perpendicular to said second axis.

According to a further characteristic, the direction of said lever forms an angle $\gamma$ with respect to a first plane perpendicular to said first axis.

According to yet another characteristic, the direction of said strut, when it is aligned in the extended position of the landing gear, forms an angle $\beta$ with said first plane.

According to another characteristic, the projection of the direction of the shock absorber in the extended position of the landing gear forms, on the second plane, perpendicular to the first, an angle $\alpha$ with said first plane.

According to another feature, if, in the extended position of the landing gear, b is the distance from said first axis to the strut and c is the average distance from the shock absorber to said first axis, the values of said angles $\alpha$ and $\beta$ are substantially related by the formula;

$$c/b = f(\tan \beta / \tan \alpha)$$

Other characteristics and advantages of the present invention will appear from the following description given for illustrative purposes only with reference to the appended drawings.

BRIEF DESCRIPTION OF THE DRAWINGS

FIGS. 2 and 3 are diagramatic views which represent respectively, under two different angles, the landing gear according to FIG. 1 in simplified form; and FIG. 4 is a diagramatic elevational view which represents schematically an embodiment of a landing gear according to the invention in a tandem arrangement.

DESCRIPTION OF PREFERRED EMBODIMENTS

Figure 1:
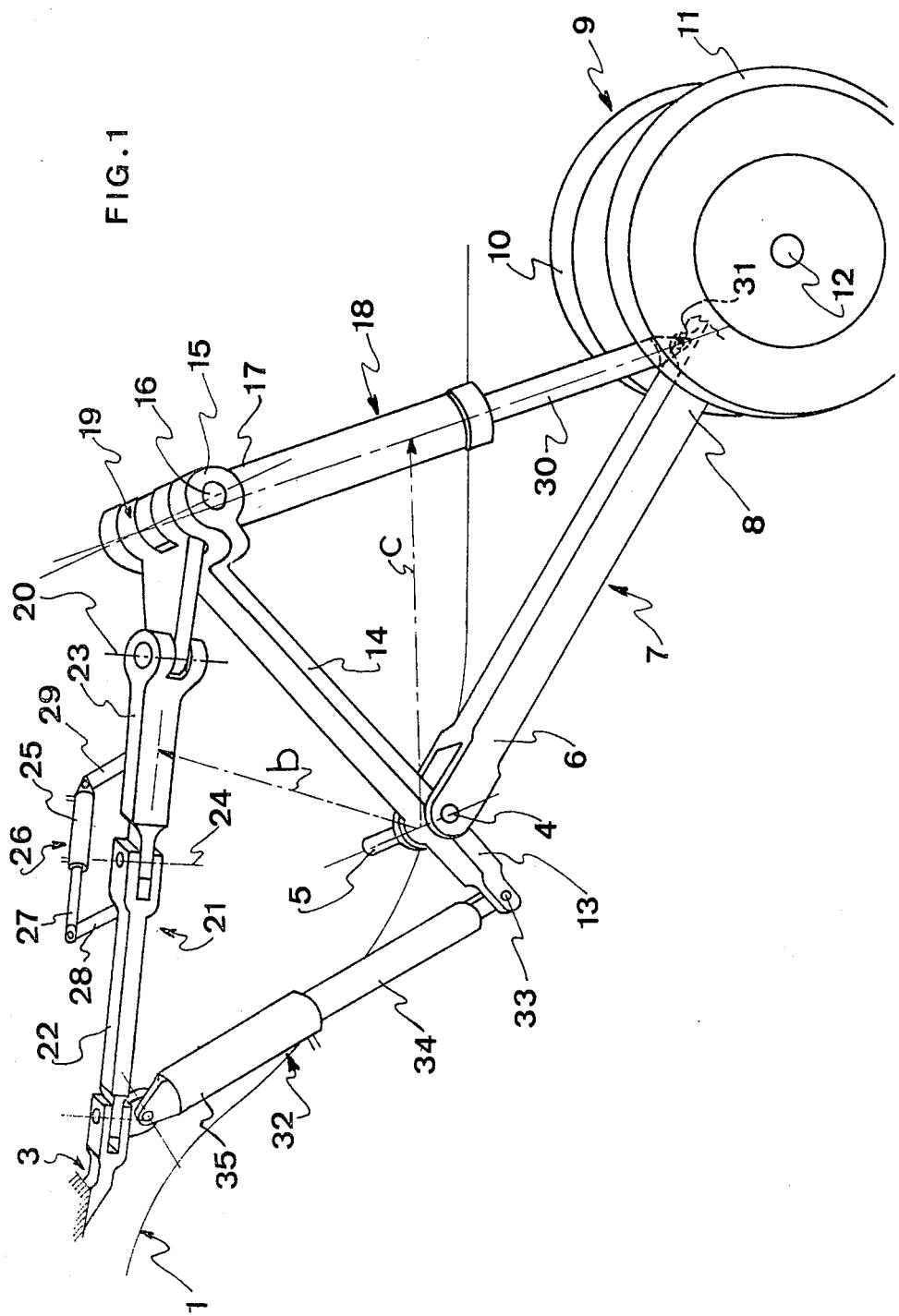
FIG. 1 is a perspective view which represents an embodiment of a landing gear according to the invention in its twin-wheel arrangement.

More particularly, referring to FIG. 1, the illustrated landing gear is capable of being placed on a rigid frame 1 of an aircraft, comprising essentially two attachment points 3 and 4.

Thus, at the point 4 is provided a pin 5 incorporated in the frame 1 of the aircraft and carrying, mounted swivellably on it, one end 6 of a rocker beam 7 whose other end 8 supports rolling means 9, for example, two wheels 10 and 11 in a twin-wheel arrangement, i.e. two wheels parallel to each other, placed substantially on the same axle 12.

The pin 5 also supports in rotation an end 13 of a lever 14 which rotates freely around it.

It is pointed out that the rocker beam 7 and the lever 14 could be mounted on two different axes, but that the illustrated configuration represents the most advantageous method.

The other end 15 of the lever 14 carries a rotation or pivot pin 16, preferably parallel to the pin 5, around which are mounted respectively an end 17, in this case the cylinder, of a shock absorber 18 and a knuckle joint 19 whose other axis of freedom 20 is substantially perpendicular to the axis 16.

The landing gear includes, among other things, between the pivoting point 3, and the axis 20 of the knuckle joint 19, a strut 21 made up respectively of two end to end joined links 22 and 23 capable of pivoting in relation to each other around an axis 24 substantially perpendicular to the previously defined axis 5.

This strut 21 makes it possible to obtain a definite distance between the point 3 and the axis 16 when the two links 22 and 23 are aligned (or the strut is in an "unbroken" condition).

On the other hand, it is necessary, for example in order to move a retractable landing gear from an extended position to a retracted position, to "break" the alignment of these two links 22 and 23.

The means for accomplishing this consist essentially of an auxiliary actuator 26 connected respectively by its two ends, in this case the cylinder 25 and its rod 27, to two lugs 28 and 29 incorporated respectively in the links 22 and 23.

Of course, the other end 30 of the shock absorber 18, i.e. its rod, is connected to a point 31 of the rocker beam 7, the latter being relatively near the axis 12, supporting the two wheels 10 and 11 and in particular, in a conventional manner, by a knuckle joint.

This does not appear in the figure, but does not present any design difficulty since it is known to those of the art.

The landing gear is shown in FIG. 1 in its extended position, i.e. when the aircraft rolls on the ground.

Of course, when the aircraft is airborne, it will be necessary to retract the landing gear to bring it to its stowed position.

The actuating means for bringing the extended landing gear to the retracted position consists of a so-called main actuator 32, one end of which, in this case the rod 34, is connected to the end 13 of the lever 14 at a point 33. This actuator makes it possible to exert a force couple in relation to the axis 5.

The other end 35 of the acutator 32, namely the cylinder, is advantageously connected to a fixed point of the structure 1 of the aircraft and preferably to the point 3 previously defined.

The landing gear just described has other structural characteristics which do not appear clearly in FIG. 1.

These will be explained notably with respect to FIGS. 2 and 3 which, although schematic, represent the same embodiment of the landing gear as that of FIG. 1. On the other hand, the essential elements of the structure of this landing gear have been represented only by portions of lines but it is quite evident that the same references represent the same elements.

Before detailing these additional structural characteristics, the movement of the landing gear from its extended position to its retracted position will be described here. It takes place in the following manner:

First of all, the two actuating cylinders, the main one 32 and the auxiliary one 26, are operated simultaneously. Thus, the alignment of the strut 21 is broken so that the two links 22 and 23 have a tendency to move by pivoting one over the other in a plane substantially parallel to the axes 5 and 16.

In addition, at the same time, the actuating cylinder 32 is operated so that its length increases, in the illustrated embodiment, and so that the end 15 of the lever 14 can pivot while pulling on the shock absorber 18 and hence on the lever 14. Thus, the rocker beam 7 and the wheels 10 and 11 pivot counterclockwise and rise into a wall provided for this purpose, appearing more clearly in FIG. 2 where the retracted position of the landing gear is shown in dotted lines.

Finally, it is pointed out that when the landing gear is in its extended position, as illustrated in FIG. 1, the strut 21 is at a distance b from the axis 5, while the average distance from the shock absorber 18 to the axis 5 is equal to c.

Referring now to FIGS. 2 and 3 which are respectively two schematic views along two perpendicular planes of the embodiment of the landing gear according to FIG. 1, it is clearly seen that the lever 14 forms a non-negligible angle $\gamma$ in relation to the plane 40 perpendicular to the axis 5 and containing the rocker beam 7.

These figures show, particularly FIG. 2, that the well 41 provided on the side of the fuselage is mounted on the frame 1 of the aircraft.

The wheels rise into this well when the landing gear is in the retracted position.

FIG. 2 shows an advantage of this landing gear. In fact, when it is in the retracted position, the strut 21 is "broken" so that it occupies a substantially horizontal position just over the front of the wheels (shown in dotted lines).

This embodiment makes it possible to obtain a well 41 of reduced height, since this strut occupies the space left free in front of the wheels.

Referring more particularly to FIG. 3, it is seen that the strut 21 and the shock absorber 18 form non-zero angles $\alpha$ and $\beta$ respectively with the plane 40 defined previously.

In fact, the value of the angle $\alpha$ represented in FIG. 3 is the value of the angle formed by the projection of the shock absorber 18 onto a plane perpendicular to the plane 40 previously defined. This plane is thus parallel to the axes 5 and 16.

This structure is particularly advantageous because it makes it possible to compensate, when the landing gear is subjected to forces, the reactions produced at the level of the axis 16 on the lever 14 respectively by the strut and the shock absorber. It is in fact noted that, if the values of the angles $\alpha$ and $\beta$ are chosen such that they are related by the formula $c/b=f$ (tan $\beta$/tan $\alpha$), where c and b are defined as previously, the forces transmitted respectively by the shock absorber and the strut are compensated and thus make is possible to obtain a lever 14 offering little resistance because it does not undergo major forces and hence can be machined in relatively small thicknesses. This leads to a considerable reduction in the weight of such a landing gear.

Finally, FIG. 4 illustrates in a very schematic manner an advantageous embodiment of a landing gear of the tandem type including essentially, in its left-hand portion, the structural elements of the landing gear as described in relation to FIGS. 1 to 3.

This landing gear requires only three attachment points to the frame, namely 53, 54 and 55, and comprises essentially, between the point 53 and an axis 56, a strut 57 of the type shown at 21 in FIG. 1, a lever 58 between the axis 56 and the axis 54, and a shock absorber 59 between the point 56 and a point 60 of a rock beam 61, the rock beam 61 having only one wheel 62 mounted on an axis 63.

The strut 57, the lever 58, the rocker beam 61 and the shock absorber 59 are arranged in the same manner as the corresponding elements in FIG. 1. However, the landing gear according to FIG. 4 includes in addition, from the fixed point 55, a second lever 64, a second rocker beam 65, a second shock absorber 66 and a second wheel 67 mounted on a second axis 68.

The elements, mainly the lever 64, the rocker beam 65 and the shock absorber 66, are also arranged in the same manner as the corresponding elements in the left-hand part of this same landing gear and in accordance with those of FIG. 1.

Furthermore, the two levers 58 and 64 are connected by a rod 70 of constant length. In this manner, the connecting rod 70 and the two levers 58 and 64 swivel respectively around two axes 54 and 55 forming a deformable parallelogram.

Finally, according to FIG. 4, the landing gear has means for applying a pivoting force to at least one of the two levers 58, 64.

As shown in the figure, these means can advantageously be composed of an actuating cylinder, one end of which is mounted pivotably on the axis 56, and the other end pivotably at 72 on the lever 64 at a different point of the axis 55 so as to exert a force couple on the lever 64.

This tandem-type landing gear operates as follows.

Simultaneously, at the beginning, the alignment of the strut 57 is broken and the actuating cylinder 71 is operated so that, according to the illustrated embodiment, it extends. Thus, the lever 64 undergoes a counterclockwise rotation and, through the connecting rod 70, exerts a force on the pin 56 so as to also cause the pivoting of the lever 58.

In a second phase, when the alignment of the strut 57 is broken, only the actuating cylinder 71 is operated until the wheels 62 and 67 rise into a well of the type in conformity with the one illustrated at 41 in FIG. 2.

Of course, the angles previously defined, notably with respect to FIGS. 2 and 3, are the same for the left-hand and right-hand parts of the landing gear.

It is obvious that the advantages described above in connection with the embodiment according to FIGS. 1 to 3 also apply in the case of this so-called tandem landing gear according to FIG. 4 but, in addition, it is apparent that, specifically for this type of landing gear, the embodiment makes it possible, with the same basic elements, notably the levers, rocker beams, shock absorbers and struts, to obtain either a landing gear of the twin-wheel type or a tandem-type landing gear, the only elements to be modified being possibly the actuating cylinder and the connecting rod 70.

It is quite evident that this represents no difficulty either for mounting or for manufacturing.

Finally, in certain cases, it will be advantageous for the two links 22 and 23 to be locked in at least one of the positions corresponding either to landing gear retraction or landing gear extension.

These means for locking the two links together can consist notably, for example of a locking box of the type known to aeronautical technicians.

What is claimed is:

1. Retractable landing gear actuated between two positions, respectively the retracted and extended positions, for a rigid-frame air craft, said landing gear comprising: a lever mounted rotatably on a first pin at a first attachment point incorporated in the frame and forming a first pivot axis, a rocker beam mounted rotatably at one end on a second pin incorporated in said frame at said first attachment point, a "breaking" strut mounted rotatably at a first of its ends onto a second attachment point incorporated in said frame and including at least two alignable parts, connecting means for linking the other end of said strut to said lever at a second point thereof defining a second pivot axis, controllable means for "breaking" the alignment of said strut parts, a shock absorber connecting said second point of said lever to a second point of said rocker beam and means for applying a controllable pivoting force to said lever.

2. The landing gear of claim 1, wherein the axes of said first and second pins coincide to form said first pivot axis.

3. The landing gear of either claims 1 or 2 wherein said connecting means consist of a knuckle joint with two substantially perpendicular degrees of freedom.

4. The landing gear of claim 1, wherein said strut consists of two links pivoting on each other around a third pivot axis substantially perpendicular to said second pivot axis.

5. The landing gear of claim 1 wherein the direction of said lever forms an angle $\gamma$ with respect to a first plane perpendicular to said first axis.

6. The landing gear of claim 5 wherein the direction of said strut, when it is aligned in the extended position of the landing gear, forms an angle $\beta$ with said first plane.

7. The landing gear of claims 5 or 6 wherein the projection of the direction of the shock absorber in the extended position of the landing gear forms, on a second plane, perpendicular to the first, an angle $\alpha$ with said first plane.

8. The landing gear of claim 7, wherein the values of said angles $\alpha$ and $\beta$ are substantially related by the formula $c/b = f(\tan \beta / \tan \alpha)$, wherein in the extended position of the landing gear, b is the distance from said first axis to the strut and c is the average distance from the shock absorber to said first axis.

9. The landing gear of claim 1, wherein the means for applying a pivoting force on said lever consists of an actuating cylinder.

10. The landing gear of claim 9 wherein said actuating cylinder has one of its ends mounted pivotably onto said first attachment point incorporated in the frame and the other end onto said lever at a second point not coinciding with the first axis.

11. The landing gear of claim 4, further comprising a second lever mounted rotatably on a fourth axis incorporated in said frame, said fourth axis being substantially parallel to the first, a second rocker beam mounted rotatably on a fifth axis incorporated in said frame, said fifth axis being substantially parallel to said second axis, and a connecting rod of constant length pivotably linking said two levers so as to form with said two levers a deformable parallelogram.

12. The landing gear of claims 4 or 11 wherein said strut comprises means for locking said two links in relation to each other in at least one position corresponding to the retracted and extended positions of the landing gear.

13. The landing gear of claim 12 wherein said locking means consist of a locking box.

* * * * *